US00RE35681E

United States Patent [19]

Mitsui et al.

[11] E Patent Number: Re. 35,681

[45] Reissued Date of Patent: Dec. 2, 1997

[54] ATMOSPHERIC PRESSURE IONIZATION MASS SPECTROMETER

[75] Inventors: Yasuhiro Mitsui, Fuchu; Osami Okada, Chofu, both of Japan

[73] Assignee: Hitachi, Ltd., Tokyo, Japan

[21] Appl. No.: 600,715

[22] Filed: Feb. 13, 1996

Related U.S. Patent Documents

Reissue of:

[64] Patent No.: 4,769,540
Issued: Sep. 6, 1988
Appl. No.: 924,640
Filed: Oct. 30, 1986

[30] Foreign Application Priority Data

Oct. 30, 1985 [JP] Japan ..... 60-241418

[51] Int. Cl.[6] ..... H01J 49/04

[52] U.S. Cl. ..... 250/282; 250/281

[58] Field of Search ..... 250/288, 423, 250/281

[56] References Cited

U.S. PATENT DOCUMENTS

| | | | |
|---|---|---|---|
| 3,842,266 | 10/1974 | Thomas | 250/288 |
| 4,023,398 | 5/1977 | French et al. | 250/281 |
| 4,121,099 | 10/1978 | French et al. | 250/281 |
| 4,144,451 | 3/1979 | Kambara | 250/281 |
| 4,542,293 | 9/1985 | Fenn et al. | 250/288 |

FOREIGN PATENT DOCUMENTS

| | | |
|---|---|---|
| 1398167 | 6/1975 | United Kingdom . |
| 2127212 | 4/1984 | United Kingdom . |

OTHER PUBLICATIONS

Gray and Date, "Inductively Coupled Plasma Source Mass Spectrometry Using Continuum Flow Ion Extraction", *The Analyst*, vol. 108, No. 1290, pp. 1033–1050, Sep. 1983.

*Primary Examiner*—Jack I. Berman
*Attorney, Agent, or Firm*—Jenner & Block

[57] ABSTRACT

An atmospheric pressure ionization mass spectrometer which comprises an ion source for ionizing a sample gas, a low pressure region provided with a mass filter and a collector therein, a differential pumping region provided between the ion source and the low pressure region and with electrodes provided on the side of the ion source and on the side of the low pressure region, respectively, and a pressure-gradient electrode means for dissociation and removal of cluster ions, as connected to the electrode on the side of the ion source among the electrodes provided in the differential pumping region is disclosed.

4 Claims, 3 Drawing Sheets

ATMOSPHERIC PRESSURE IONIZATION MASS SPECTROMETER

Matter enclosed in heavy brackets [ ] appears in the original patent but forms no part of this reissue specification; matter printed in italics indicates the additions made by reissue.

BACKGROUND OF THE INVENTION

This invention relates to an improvement in an atmospheric pressure ionization mass spectrometer, and particularly to an apparatus for removing cluster ions, suitable for efficient removal of clustor ions giving rise to sensitivity lowering and spectrum complication.

The atmospheric pressure ionization mass spectrometer is an apparatus very sensitive to gaseous substances and has now been practically utilized in the fields of pollution measurement, semiconductor production process and metabolite analysis. The atmospheric pressure ionization mass spectrometer is characterized by its high sensitivity, and thus it is important to eliminate factors inhibiting this high sensitivity.

A conventional atmospheric pressure ionization mass spectrometer is shown in FIG. 1, where a sample gas 15 is introduced into an ion source 3 through a sample inlet pipe 1, and a portion of the sample gas 15 is ionized under an ion source pressure of 1 atm. The thus formed ions are led to a low pressure region 9 through a differential pumping region 6. There is a quadrupole mass analyzer 7 in the low pressure region 9, and the ions are separated according to the masses, and reach an ion collector 8. The ion current obtained at the collector 8 is output to a recorder 12 and a computer 14 through an amplifier 13. The pressure in the low pressure region 9 is kept at about $10^{-4}$ Pa by the working pressure of the quadrupole mass analyzer 7. The differential pumping region 6 is provided to connect the low pressure region 9 to the ion source 3 under 1 atm, and is partitioned from the ion source 3 under 1 atm by a first aperture electrode 4 having an aperture through which the ions can pass and by a second aperture electrode 5 having an aperture through which the ions can pass.

Ionization of the atmospheric pressure ionization mass spectrometer is initiated by corona discharge at the tip end of a needle electrode 2 to which a high voltage is applied. Trace amounts of oxygen, carbon dioxide, and organic compounds (M) are contained in a nitrogen gas, through ionization as follows:

$$N_2 \xrightarrow{\text{Corona discharge}} N_2+, N+ \quad (1)$$

$N_2$, which is a main component in the sample gas 15, is ionized according to the reaction (1), but the ions formed according to the equation (1) undergo the following reactions owing to the very short mean free path because the ionization is carried out under 1 atm.

$$N_2+ + 2N_2 \rightarrow N_4+ + N_2 \quad (2)$$

$$N+ + 2N_2 \rightarrow N_3+ + N_2 \quad (3)$$

$$N_4+ + O_2 \rightarrow O_2+ + 2N_2 \quad (4)$$

$$N_4+ + CO_2 \rightarrow CO_2+ + 2N_2 \quad (5)$$

$$N_4+ + H_2O \rightarrow H_2O+ + 2N_2 \quad (6)$$

Since the ionization potential of $N_4$ is higher than those of $O_2$, $CO_2$, $H_2O$, etc., ions of trace components are formed in the nitrogen gas according to the reactions (4), (5) and (6). The main component ions which are not analytical objects are converted to trace component ions, which are analytical objects, as given by the reactions (4), (5) and (6), which also occur under 1 atm. Thus, there are many chances for the reactions, and a highly efficient ionization of the analytical trace components as the objects can be attained. Since these ions are detected in the analytical region 9 through the differential pumping region 6, the atmospheric pressure mass spectrometer can have a higher sensitivity. However, the following reactions occur to inhibit the higher sensitivity.

$$H_2O+ + 2N_2 \rightarrow H_2O+.N_2 + N_2 \quad (7)$$

$$H_2O+.N_2 + 2N_2 \rightarrow H_2O+.(N_2)_2 + N_2 \quad (8)$$

$$H_2O+.N_2 + H_2O \rightarrow H_3O+ + OH + N_2 \quad (9)$$

$$H_3O+ + H_2O + N_2 \rightarrow H+(H_2O)_2 + N_2 \quad (10)$$

$$H+(H_2O)_{n-1} + H_2O + N_2 \rightarrow H+(H_2O)_n + N_2 \quad (11)$$

$$H+(H_2O)_n + M + N_2 \rightarrow M.H+(H_2O)_n + N_2 \quad (12)$$

The ions formed according to the reactions (8) to (12) are called cluster ions, which have the following disadvantages: the spectrum will be complicated, because, for example, the proper peak of water appears at m/z=18, whereas cluster ions develop peaks at other values of m/z, for example, $H_2O+.N_2$ (m/z=46), $H_2O+.(N_2)_2$ (m/z=74), etc., and S/N ratio will be lowered, because the properly single peak is divided into a plurality of peaks. Particularly, the lowering of S/N ratio will reduce the sensitivity, and thus the removal of the cluster ions is indispensable for an atmospheric pressure ionization mass spectrometer.

The prior art of removing the cluster ions, as disclosed in Japanese Patent Application Kokai (Laid-open) No. 53-81289 proposes to provide a drift electric field in the differential pumping region 6 in FIG. 1 to make the clustor ions collide with neutral molecules, thereby dissociating the cluster bonds. That is, a voltage is applied between the electrode 4 and the electrode 5 to accelerate the cluster ions and make them collide with the neutral molecules. The kinetic energy of the cluster ion is converted to the internal energy by the collision, and if the number of collisions is enough, the cluster ions will be dissociated at the weak bonds.

$$H_2O+.(N_2)_2 + N_2 \rightarrow H_2O+.N_2 + 2N_2 \quad (13)$$

$$H_2O+.N_2 + N_2 \rightarrow H_2O+ + 2N_2 \quad (14)$$

$$M.H+.(H_2O)_n + N_2 \rightarrow M.H+.(H_2O)_{n-1} + H_2O + N_2 \quad (15)$$

$$M.H+(H_2O)_n + N_2 \rightarrow MH+ + H_2O + N_2 \quad (16)$$

The cluster bond energy is generally smaller than the chemical bond energy. Therefore the cluster bond is dissociated according to the reactions (13)–(16) and molecular ions are produced. In the prior art the pressure in the intermediate pumping region is constant (the number of collisions is constant), and thus the control of cluster bond dissociation has been so far carried out by controlling the kinetic energy, that is, by controlling the voltage applied to the electrodes 4 and 5 (drift voltage). However, when the drift voltage is increased to dissociate $M.H+.(H_2O)_n$ clusters having a larger n in the prior art controlling method, the optimum conditions for focusing the ion beams into the aperture of the electrode 5 cannot be obtained, and thus the amount of ions to be introduced into the analytical region 9 is reduced. When the drift voltage is not to be increased, it is necessary to increase the number of collisions. When the pressure of the differential pumping region 6 is elevated to increase the number of collisions, the pressure of the low pressure region 9 will be increased and the aperture of the electrode 5 is liable to be fouled. This gives rise to charge-up and a consequential reduction in the amount of ions to be introduced into the low pressure region 9. These are serious disadvantages of the prior art.

SUMMARY OF THE INVENTION

An object of the present invention is to provide an atmospheric pressure ionization mass spectrometer, where the pressure in the ionization region is higher than that in the analytical region, which can readily and efficiently dissociate cluster ions as a cause for the lowering of sensitivity and the complication of spectrum.

The object of the present invention can be attained by providing a pressure-gradient electrode in a differential pumping region, the pressure-gradient electrode being connected to an electrode partitioning the differential pumping region from an atmospheric pressure ion source, while providing a drift electric field in the differential pumping region. The pressure in the differential pumping region is higher toward the ion source and lower toward the low pressure region.

With this characteristic structure of the present invention, the number of collisions can be increased to obtain an energy high enough to dissociate the cluster ions. This is because the pressure is higher toward the ion source in the differential pumping region. The drift voltage can be kept to optimum conditions for focusing the beams. On the other hand, the pressure is lower toward the low pressure region in the differential pumping region, and thus the pressure in the low pressure region will not be increased. Furthermore, the electrode partitioning the differential pumping region from the low pressure region (second aperture electrode) is less fouled. In the present invention, cluster ions inhibiting the higher sensitivity can be efficiently removed in this manner.

DETAILED DESCRIPTION OF THE PREFERRED EMBODIMENTS

The present invention will be described in detail below, referring to the accompanying drawings.

Figure 1:
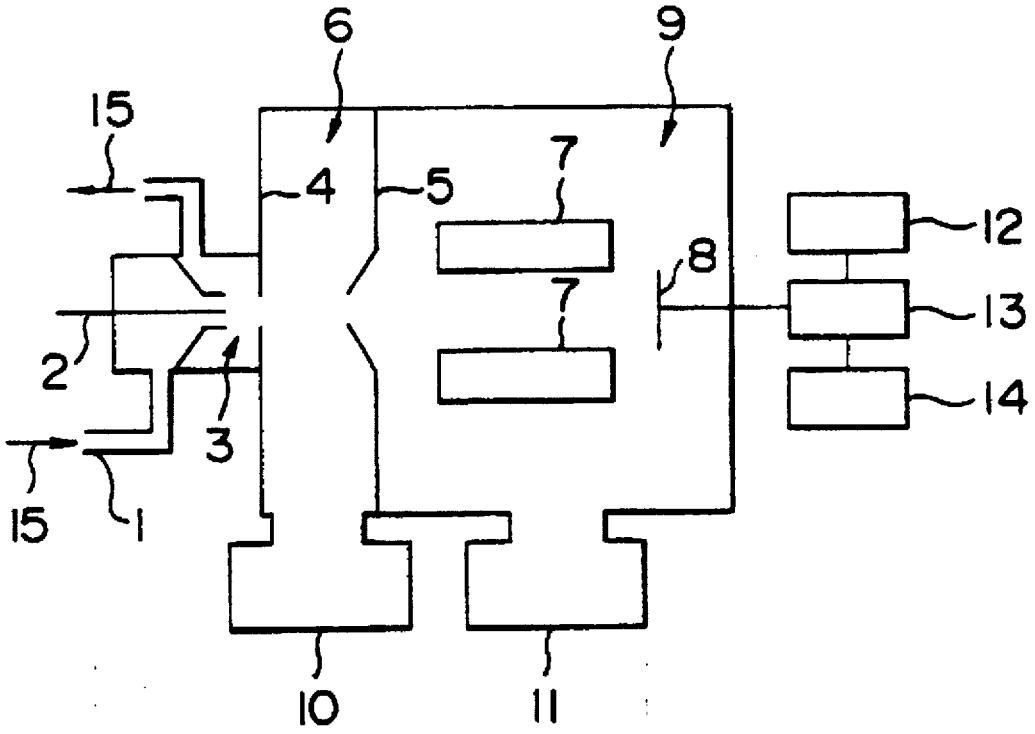
FIG. 1 PRIOR ART
FIG. 1 is a schematic structural view of an atmospheric pressure ionization mass spectrometer according to the prior art.
Figure 2:
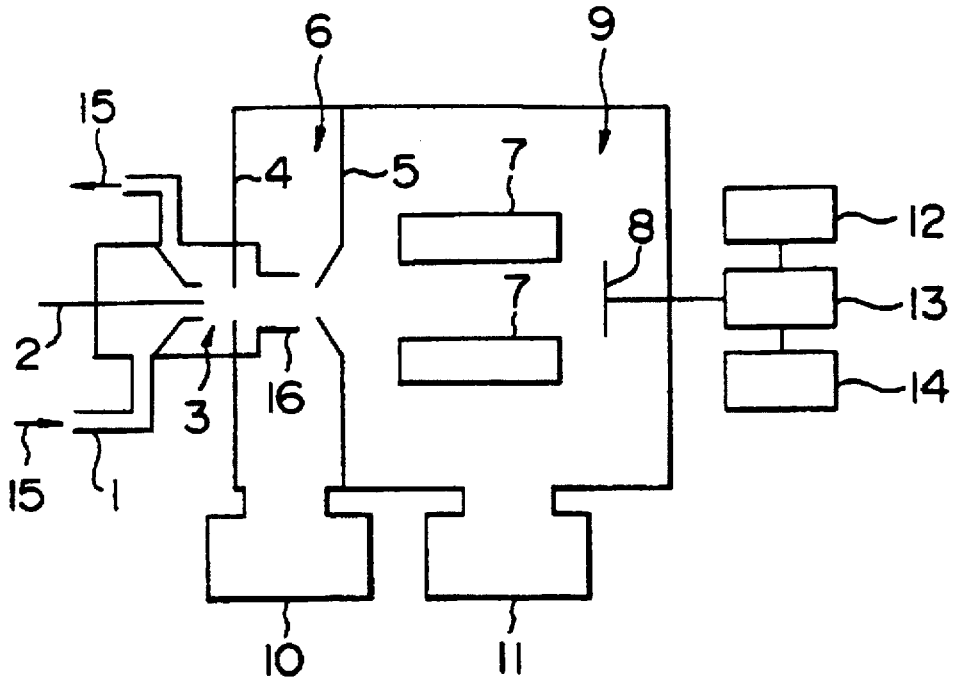
FIG. 2 is a schematic structural view of an atmospheric pressure ionization mass spectrometer according to one embodiment of the present invention.

FIG. 2 shows a basic structure of an atmospheric pressure ionization mass spectrometer, provided with a pressure-gradient electrode in the differential pumping region.

In FIG. 2, a sample gas 15 containing trace components is introduced into an ion source 3 through a sample inlet pipe 1. The thus introduced sample gas is ionized (primary ionization) by corona discharge at the tip end of a needle electrode 2 to which a high voltage is applied. Then, charge transfer reaction from the main component ions having a higher ionization potential to trace component molecules having a lower ionization potential proceeds as secondary ionization. The ion source under 1 atm. has a short mean free path, so that one ion usually repeats $10^5$ to $16^6$ collisions within the ion source 3. Thus, even the trace components take part in the collisions substantially 100%, and the ionization can be carried out with a high efficiency. At that time cluster ions, which inhibit the higher sensitivity of the atmospheric pressure ionization mass spectrometer and complicate the spectrum, thereby making the analysis disadvantageous, are also formed. The ions produced in the ion source 3 are introduced into the differential pumping region 6. Among the ions introduced into the differential pumping region 6, the cluster ions are dissociated by collisions with neutral molecules and the resulting excitation in the differential pumping region 6, and turn into molecular ions or quasi-molecular ions. That is, a drift electric field is formed in the differential pumping region 6 by the voltage applied between the electrodes 4 and 5. The ions travel through the drift electric field from the electrode 4 toward the electrode 5, while converting the kinetic energy to the internal energy through the collisions with the neutral molecules. The internal energy is thoroughly excited through numbers of the collisions, and the cluster bonds are ultimately dissociated. A relatively large energy is required for conversion of cluster ions such as $M.H+.(H_2O)_n$ with a higher n to M.H+. Such an energy can be given either by giving a large kinetic energy, that is, applying a high drift voltage, or by increasing the number of collisions, that is, increasing the pressure of the differential pumping region. However, when too high a drift voltage is applied to dissociate the cluster ions, the ion beams will not be focused to one point, and thus will not efficiently pass through the aperture of electrode 5. That is, an ion loss occurs at the electrode 5, and the amount of ions to be introduced into the low pressure region 9 is reduced, with a failure to obtain a higher sensitivity. On the other hand, when the pressure is much elevated in the differential pressure region 6, the pressure in the low pressure region will be elevated at the same time, and a vacuum pump 11 of higher evacuation capacity must be used to adjust the elevated pressure in the low pressure region. That is, there are problems in the cost and the portability of the analyzer. Furthermore, the elevated pressure leads to fouling of the aperture of electrode 5 and consequent charge-up, and thus the amount of ions to be introduced into the low pressure region is reduced, inhibiting the higher sensitivity.

According to one embodiment of the present invention, the pressure-gradient electrode 16 is provided in the differential pumping region 6, as connected to the electrode 4, and takes a cylindrical or similar shape. The pressure-gradient electrode 16 is connected to the electrode and is open at the end near the electrode 5. That is, the evacuation resistance in the ion passage area near the aperture of electrode 4 is large in the differential pressure region 6, and the pressure is increased in that area. The evacuation resistance in the area near the aperture of electrode 5 is not influenced thereby, and thus the pressure is not increased. That is, a sharp pressure gradient is provided between the electrode 4 and the electrode 5. Thus, the cluster ions introduced from the ion source 3 are subjected to increased number of collisions owing to the increased pressure in the area near the electrode 4 in the differential pumping region 6, and can receive enough energy to occasion the dissociation of clusters without applying a higher drift voltage. Furthermore, since the pressure in the area near the aperture of the electrode 5 in the differential pumping region 6 is not increased, the pressure in the low pressure region 9 is not influenced, either, and no fouling of the aperture of the electrode 5 occurs due to the pressure increase.

The cluster ions dissociated through the foregoing cluster dissociating mechanism turn into molecular ions or quasi-molecular ions, which are introduced into the low pressure region 9 and separated according to masses by a quadrupole mass analyzer 7 and turn into ionic currents at a collector 8. The ionic currents are output to a recorder 12 and a computer 14 through an amplifier 13. In this embodiment a sensitivity about three times higher than that of the prior art can be obtained.

Figure 3:
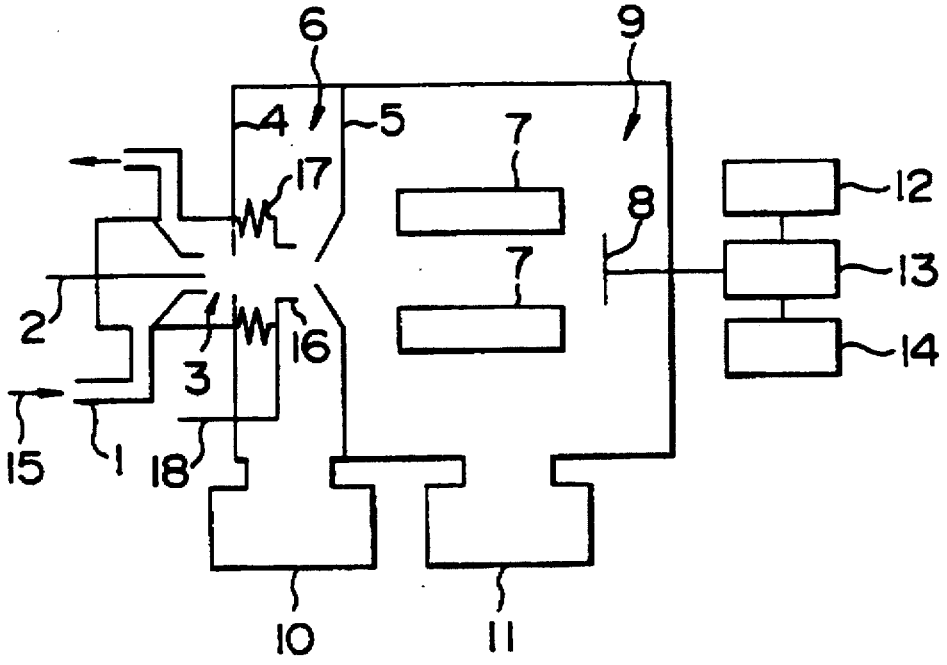
FIG. 3 is a schematic structural view of an atmospheric pressure ionization mass spectrometer according to another embodiment of the present invention.

FIG. 3 shows a moving mechanism provided in the pressure-gradient electrode 16 of FIG. 2, though the cluster dissociation mechanism is the same as shown in the embodiment of FIG. 2. In this embodiment, the following effects can be obtained. That is, a bellows 17 is provided on the pressure-gradient electrode 16, and an expanding-contracting mechanism 18 of bellows 17 can be operated from the outside of the vaccuum vessel, so that an optimum pressure gradient can be set while actually measuring the ions.

Figure 4:
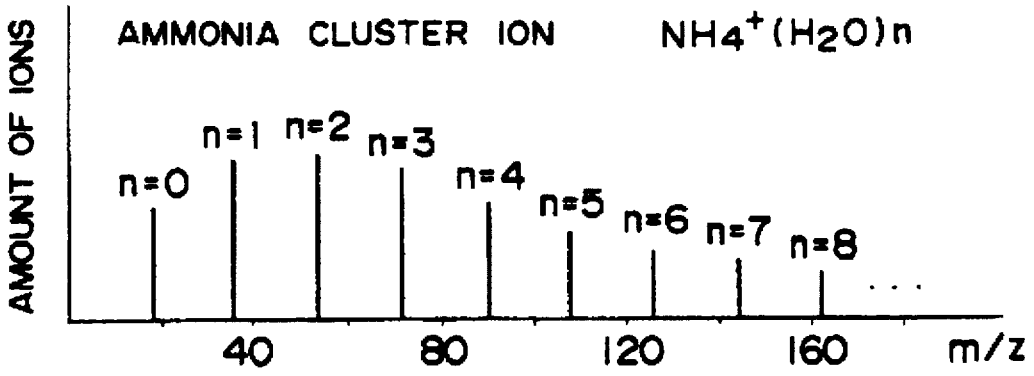
FIG. 4 is a spectral diagram of cluster ions in an undissociated state.
Figure 5:
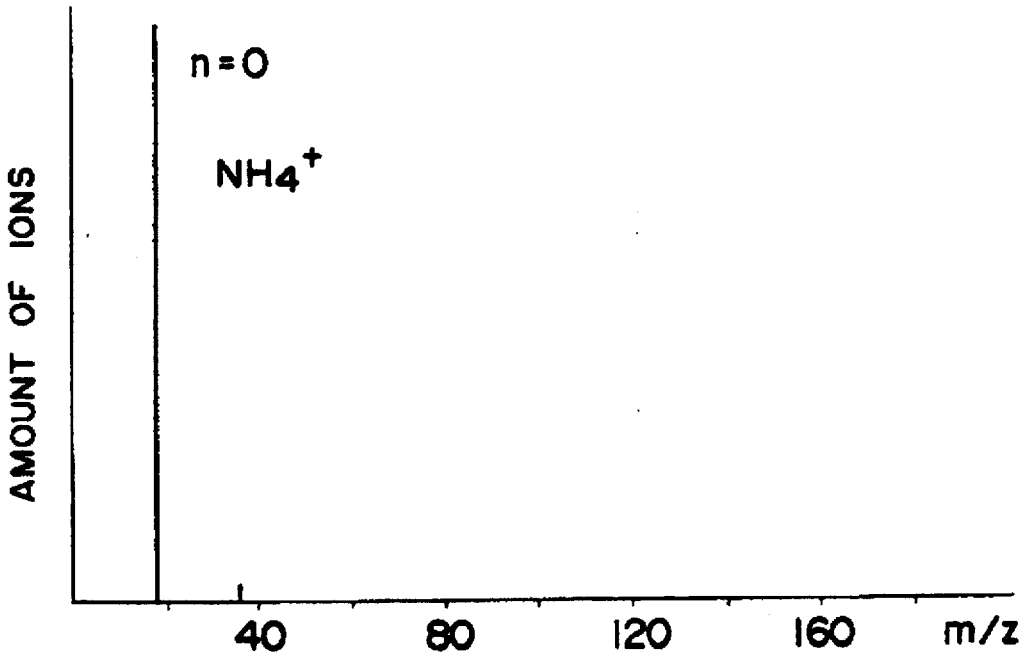
FIG. 5 is a spectral diagram of cluster ions in a dissociated state.

FIG. 4 and FIG. 5 show spectra in the case that no cluster dissociation is carried out when trace amounts of ammonium and water are contained in a nitrogen gas and in the case that the cluster dissociation is carried out, respectively. That is, FIG. 4 shows the case of no cluster dissociation and FIG. 5 the case of dissociation according to the present invention.

As is obvious from FIG. 4, a peak of ammonirm ($NH_4$+) properly as a single peak is distributed into a plurality of peaks owing to the cluster formation, reducing the S/N ratio, whereas in the present invention, as is obvious from FIG. 5, a substantially single, proper ammonium peak can be obtained owing to the cluster dissociation, improving the S/N ratio.

According to the present invention, the cluster ions inhibiting the higher sensitivity of an atmospheric pressure ionization mass spectrometer can be removed ty dissociation without loss in the amount of ions, increase in the amount of a gas to be introduced into the low pressure region or fouling of the aperture through which the ions pass, as described above, and thus the higher sensitivity, which is a most important object in the atmospheric pressure ionization mass spectrometer, can be effectively attained.

What is claimed is:

1. An atmospheric pressure ionization mass spectrometer comprising:

an ion source for ionizing a sample gas;

a low pressure region provided with a mass filter and a collector therein;

a differential pumping region provided between said ion source and said low pressure region;

first and second electrodes provided on one side of said ion source and on one side of said low pressure region, respectively; and a pressure-gradient electrode means for providing an [increasing] *increased* pressure *having a* gradient from said first electrode toward said second electrode for dissociation and removal of cluster ions, said pressure-gradient electrode means being connected to said first electrode and being provided in said differential pumping region.

2. An atmospheric pressure ionization mass spectrometer according to claim 1, wherein said pressure-gradient electrode means comprises a cylindrically-shaped electrode including a base end connected to said first electrode and a tip end having a smaller size than that of said base end.

3. An atmospheric pressure ionization mass spectrometer according to claim 2, wherein said pressure-gradient electrode means is provided with an operating means for adjusting the length of said pressure-gradient electrode means by extending said pressure-gradient electrode means substantially perpendicular to said first and second electrodes.

4. An atmospheric pressure ionization meass spectrometer according to claim 3, wherein said pressure-gradient electrode means comprises an electrode having a bellows for adjusting the length of said pressure-gradient electrode means.

* * * * *